No. 825,987. PATENTED JULY 17, 1906.
A. F. THOMPSON.
MATCH BOX.
APPLICATION FILED APR. 6, 1906.
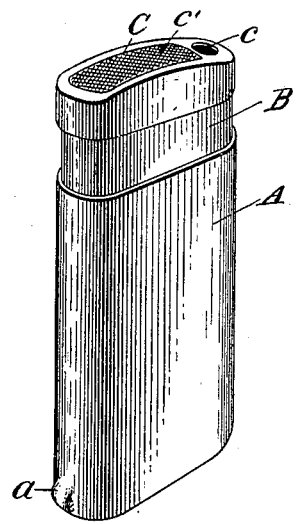
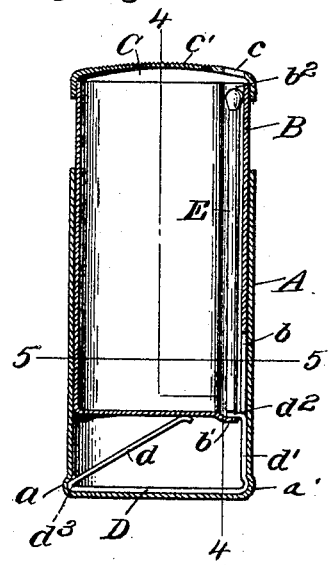
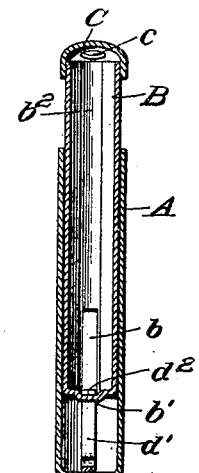
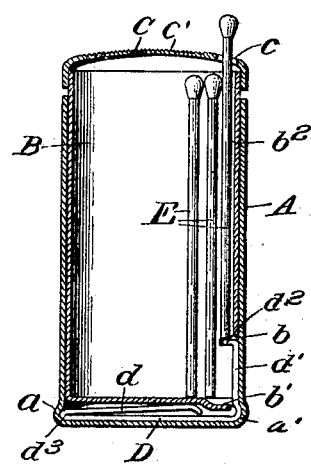
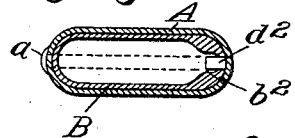
Inventor
Augustus F. Thompson
By Davis & Davis,
Attorneys
Witnesses
F. C. Gibson
L. B. Bridges

UNITED STATES PATENT OFFICE.

AUGUSTUS F. THOMPSON, OF HUNTINGTON, WEST VIRGINIA.

MATCH-BOX.

No. 825,987.　　　Specification of Letters Patent.　　　Patented July 17, 1906.

Application filed April 6, 1906. Serial No. 310,384.

*To all whom it may concern:*

Be it known that I, AUGUSTUS F. THOMPSON, a citizen of the United States, and a resident of Huntington, county of Cabell, State of West Virginia, have invented certain new and useful Improvements in Match-Boxes, of which the following is a full and clear specification, reference being had to the accompanying drawings, in which—

Figure 1 is a perspective view of the complete box; Fig. 2, a vertical sectional view thereof; Fig. 3, a similar view showing the manner of ejecting a match; Fig. 4, a longitudinal sectional view on the line 4 4 of Fig. 2; and Fig. 5, a horizontal section on the line 5 5 of Fig. 2.

The object of this invention is to provide a simple and inexpensive pocket match-box so constructed and arranged that it may be readily operated to deliver or eject a single match at a time, as more fully hereinafter set forth.

To the accomplishment of this object and such others as may hereinafter appear, the invention consists of the parts and combination of parts hereinafter fully described and particularly pointed out in the appended claims, reference being had to the accompanying drawings, forming a part of this specification, in which the same reference characters designate like parts throughout the several views.

Referring to the drawings annexed by reference characters, A designates the larger or exterior casing, which is closed at its bottom and open at its top and which may have any desired shape in cross-section, an oval shape, as shown, being the most desirable. The inner casing B is adapted to telescope nicely within said case A and, like case A, is closed at its bottom. The top of the casing B is closed by a cap C, which may be hinged to the case B or may be removably fitted over the rim thereof in the manner of a cover or may be removably attached in any other manner in order that the casing may be filled with matches at will. The top face of the cover is preferably provided with a roughened match-scratching surface $c'$ and at one end is provided with a delivery-hole $c$. A longitudinal slot $b$ is formed in the match-receiver at its lower end, this slot being on the same side of the casing as the hole $c$. The bottom of the match-receiver at a point adjacent to the lower end of slot $b$ is bent down slightly to form a lip $b'$.

The match-receiver is normally pressed outward by means of a spring D, which is confined in the space between the bottoms of the two casings. This spring is formed at one end with an upwardly-inclined spring-arm $d$, which normally bears against the bottom of the match-receiver and tends to force it outward. The main portion of the spring lies upon the bottom of the outer casing and its other end is bent at right angles to the main part and lies against the wall of the outer casing in longitudinal alinement with the slot $b$, so that when the match-holding casing is forced into the main casing against the action of spring-arm $d$ said part $d'$ will slide into said slot $b$. An inward-turned lip $d^2$ is formed on the upper end of the part $d'$, so as to extend through the slot $b$ and engage over upon the lip $b'$ and extend a distance about equal to the thickness of a single match into the match-holder. The spring-frame D is locked at the bottom of the main casing by having its nose portion $d^3$ sprung into an indentation $a$ in the wall of the outer casing at a point diametrically opposite the vertical part $d'$.

It will be observed that to deliver a match through the hole $c$ it is simply necessary to hold the device so that one of the matches will gravitate toward the side of the holder in line with the lip $d^2$ and the hole $c$. Then by simply pressing in the match-holder the match engaged by the lip $d^2$ will be delivered through the opening $c$, and when the match-holder is allowed to resume its normal projected position another match will fall into place, and so on until the holder is emptied, after which it may be readily refilled by removing the cover C. In assembling the parts it is simply necessary to first engage lip $d^2$ with lip $b'$ and then spring the combined locking and actuating spring D into the main casing and force it down by means of the holder until its nose $d^3$ snaps into the recess $a$, which permanently locks the two parts of the casing together and the actuating-spring in its proper position.

It will be observed that by my construction I provide an exceedingly simple single-delivery pocket match-safe which is not liable to become inoperative from long usage and the parts of which may be inexpensively manufactured and readily assembled.

It will be apparent to those skilled in the art that various mechanical embodiments of the invention are possible, and I therefore do not wish to be limited to the exact arrangement and construction shown.

What I claim, and desire to secure by Letters Patent, is—

1. In a device of the class set forth, a casing open at one end and having a recess in one wall adjacent to its bottom, a match-holding casing telescoping therein and having a delivery-hole in its top and a longitudinal slot in its side wall near its bottom, and a combined locking and actuating device consisting of a spring lying on the bottom of the casing and having one end formed into a spring-arm adapted to normally project the match-holder and its other end bent to lie against the wall of the casing and work in the slot in the match-holder wall, the upper end of this latter part being bent inward through the slot so as to engage the bottom of the match-holder, a part of said spring engaging in the aforesaid recess in the casing, for the purpose set forth.

2. The combination of a casing, a match-holder telescoping thereinto, and provided with a delivery-opening and an opening for the passage of the ejector, and a combined locking and actuating and ejecting device secured between the bottom of the casing and the bottom of the match-holder, said device consisting of a unitary structure interlocked with the casing and having two arms, one of which bears against the bottom of the match-holder and normally tends to force the same outward and the other of which enters the match-holder and limits its upward movement as well as serves as an ejector.

In testimony whereof I hereunto affix my signature, in the presence of two witnesses, this 4th day of April, 1906.

A. F. THOMPSON.

Witnesses:
W. E. WHEELER,
D. F. APPLING.